[11] Patent No.: US 10,953,538 B2
[45] Date of Patent: Mar. 23, 2021

(12) United States Patent
Matsudaira et al.

(54) CONTROL DEVICE AND LEARNING DEVICE

(71) Applicant: FANUC CORPORATION, Yamanashi (JP)

(72) Inventors: Tetsuro Matsudaira, Yamanashi (JP); Shuu Inoue, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 308 days.

(21) Appl. No.: 16/055,650

(22) Filed: Aug. 6, 2018

(65) Prior Publication Data

US 2019/0047143 A1    Feb. 14, 2019

(30) Foreign Application Priority Data

Aug. 8, 2017    (JP) .............................. JP2017-153684

(51) Int. Cl.
*G06F 17/00*    (2019.01)
*B25J 9/16*    (2006.01)
(Continued)

(52) U.S. Cl.
CPC .............. *B25J 9/163* (2013.01); *B25J 9/1674* (2013.01); *B25J 9/1676* (2013.01); *B25J 13/085* (2013.01);
(Continued)

(58) Field of Classification Search
CPC ........ B25J 9/163; B25J 9/1674; B25J 9/1676; B25J 13/085; B25J 19/06; G05B 2219/40198
(Continued)

(56) References Cited

U.S. PATENT DOCUMENTS 8,965,576 B2 *    2/2015 Chen ..................... B25J 9/1671
                                                          700/255
9,827,678 B1 *    11/2017 Gilbertson ............. B25J 18/025
(Continued)

FOREIGN PATENT DOCUMENTS

CN    102819264 A    12/2012
CN    106393101 A    2/2017
(Continued)

OTHER PUBLICATIONS

Japanese Notice of Reasons for Refusal for Japanese Application No. 2017-153684, dated Nov. 1, 2019 with translation, 10 pages.
(Continued)

*Primary Examiner* — Ronnie M Mancho
(74) *Attorney, Agent, or Firm* — RatnerPrestia (57) ABSTRACT

A control device that outputs a command for a robot includes a machine learning device that learns a command for the robot. The machine learning device includes a state observation unit that observes a state of the robot and a state of a person present in a peripheral area of the robot, as state variables representing a current state of an environment, a determination data acquisition unit that acquires determination data representing an interference state between the robot and the person, and a learning unit that learns the state of the robot, the state of the person present in the peripheral area of the robot, and the command for the robot obtained by associating the state of the robot and the state of the person present in the peripheral area of the robot by using the state variables and the determination data.

8 Claims, 7 Drawing Sheets

(51) Int. Cl.
*B25J 13/08* (2006.01)
*B25J 19/06* (2006.01)

(52) U.S. Cl.
CPC ..... *B25J 19/06* (2013.01); *G05B 2219/40198* (2013.01)

(58) Field of Classification Search
USPC .......................................................... 700/253
See application file for complete search history.

(56) References Cited

U.S. PATENT DOCUMENTS

| | | | |
|---|---|---|---|
| 2003/0076224 A1 | 4/2003 | Braune | |
| 2012/0043831 A1 | 2/2012 | Sakakibara et al. | |
| 2012/0185115 A1* | 7/2012 | Dean ...................... | F41H 7/005 701/2 |
| 2015/0202770 A1* | 7/2015 | Patron .................. | G06Q 20/384 700/245 |
| 2015/0294483 A1* | 10/2015 | Wells ...................... | G06T 7/292 382/103 |
| 2015/0294496 A1* | 10/2015 | Medasani .............. | H04N 7/181 348/159 |
| 2015/0339589 A1* | 11/2015 | Fisher ................ | G06K 9/00805 706/12 |
| 2016/0260027 A1* | 9/2016 | Kuwabara .............. | G06N 20/00 |
| 2016/0375592 A1* | 12/2016 | Szatmary .............. | B25J 11/0085 700/255 |
| 2017/0090430 A1 | 3/2017 | Nakazawa | |
| 2017/0225321 A1* | 8/2017 | Deyle .................... | B25J 9/1679 |
| 2019/0022857 A1* | 1/2019 | Conus .................... | G06N 20/00 |
| 2019/0265657 A1 | 8/2019 | Inagaki et al. | |

FOREIGN PATENT DOCUMENTS

| | | |
|---|---|---|
| CN | 106409120 A | 2/2017 |
| CN | 106557069 A | 4/2017 |
| JP | 05119823 A | 5/1993 |
| JP | 2003222295 A | 8/2003 |
| JP | 2005293154 A | 10/2005 |
| JP | 2007316799 A | 12/2007 |
| JP | 2010120139 A | 6/2010 |
| JP | 2012-040626 A | 3/2012 |
| JP | 2016159407 A | 9/2016 |
| JP | 2017030135 A | 2/2017 |

OTHER PUBLICATIONS

Chinese Office Action for Chinese Application No. 201810896937.X, dated Sep. 3. 2020 with translation, 15 pages.

* cited by examiner

CONTROL DEVICE AND LEARNING DEVICE

CROSS-REFERENCE TO RELATED APPLICATION

This application is a new U.S. Patent Application that claims benefit of Japanese Patent App cation No. 2017-153684, flied Aug. 8, 2017, the disclosure of this application is being incorporated herein by reference in its entirety for all purposes.

BACKGROUND OF THE INVENTION

1. Field of the Invention

The present invention relates to a control device and a learning device and especially relates to a control device and a learning device that are capable of optimizing an operation of a robot when a person approaches the robot.

2. Description of the Related Art

When a person enters an operation area of a robot, a conventional control device performs control for stopping the operation of the robot or for shifting the speed of the robot to the safer speed and allowing the robot to continue the operation, so as to prevent the robot from hitting the person. Japanese Patent Application Laid-Open No. 2012-040626, for example, describes the technique for performing control such that contact between a robot and a person is detected by a force sensor and generation of excessive force is prevented.

According to the conventional control, however, productivity of a robot is degraded when a person enters an operation area of the robot. If the robot is enabled to safely and efficiently continue an operation thereof even in such case, such that a robot's path is changed so as to prevent the robot from hitting a person or the robot's speed is not reduced when there is no risk to collide with a person, for example, degradation in productivity should be depressed.

SUMMARY OF THE INVENTION

The present invention is made so as to solve such problem and an object of the present invention is to provide a control device and a learning device that are capable of optimizing an operation of a robot when a person approaches the robot.

A control device according to an aspect of the present invention that outputs a command for a robot includes a machine learning device that learns a command for the robot. The machine learning device includes: a state observation unit that observes a state of the robot and a state of a person present in a peripheral area of the robot, as state variables representing a current state of an environment; a determination data acquisition unit that acquires determination data representing an interference state between the robot and the person; and a learning unit that learns the state of the robot, the state of the person present in the peripheral area of the robot, and the command for the robot obtained by associating the state of the robot and the state of the person present in the peripheral area of the robot, by using the state variables and the determination data.

In the control device according to another aspect of the invention, the state variables include a posture and a moving speed of a manipulator of the robot as data representing a state of the robot, and the state variables include an entering direction and a traffic line of the person as data representing a state of the person.

In the control device according to still another aspect of the invention, the determination data includes at least any one of whether or not the robot and the person have collide with each other, a relative distance between the robot and the person, a magnitude of the collision force, and throughput.

In the control device according to yet another aspect of the invention, the learning unit includes a reward calculation unit that obtains a reward related to an interference state between the robot and the person, and a value function update unit that updates a function representing a value of the command for the robot with respect to the state of the robot and the state of the person present in the peripheral area of the robot, by using the reward.

In the control device according to yet another aspect of the invention, the learning unit calculates the state variables and the determination data in a multilayer structure calculation.

The control device according to yet another aspect of the invention further includes a decision making unit that outputs a command value representing the command for the robot, based on a learning result obtained by the learning unit.

In the control device according to yet another aspect of the invention, the learning unit learns the command for the robot by using the state variables and the determination data, the state variables and the determination data being obtained from a plurality of robots.

In the control device according to yet another aspect of the invention, the machine learning device exists in a cloud server.

A learning device according to an aspect of the present invention that learns a command for a robot includes: a state observation unit that observes a state of the robot and a state of a person present in a peripheral area of the robot, as state variables representing a current state of an environment; a determination data acquisition unit that acquires determination data representing an interference state between the robot and the person; and a learning unit that the learns state of the robot, the state of the person present in the peripheral area of the robot, and the command for the robot obtained by associating the state of the robot and the state of the person present in the peripheral area of the robot by using the state variables and the determination data.

According to the present invention, it is possible to provide a control device and a learning device that are capable of optimizing an operation of a robot when a person approaches the robot.

BRIEF DESCRIPTION OF THE DRAWINGS

The above-described and other objects and features of the present invention will be apparent from the following embodiments which are described with reference to the accompanying drawings. Among these drawings.

DETAILED DESCRIPTION OF THE PREFERRED EMBODIMENTS

First Embodiment

Embodiments of the present invention will be described below with reference to the accompanying drawings. A control device 1 according to this embodiment of the present invention is characterized by optimizing commands for a robot when a person approaches the robot in operation. Examples of the command for a robot include a command related to selection of a speed (speed continuance, deceleration, stop) and a command related to selection of a path (a path to a destination, distinction between clockwise turn and counterclockwise turn). The control device 1 according to the present embodiment employs machine learning as a means for optimizing commands for a robot.

Here, it should be noted that a controlling object of the control device 1 according to the present embodiment is a robot which is capable of decelerating or stopping when a person bumps into or approaches the robot. Examples of the robot include a collaborative robot (a robot whose output is reduced so as not to hurt a person). The robot may be a mobile robot or a manipulator which does not move by itself.

The configuration of the control device 1 will be described with reference to the block diagram of FIG. 1. The control device 1 includes a machine learning device 100. The machine learning device 100 includes software (a learning algorithm and the like) and hardware (a processor and the like) for learning commands for a robot with respect to a state of the robot and a state of a person present in a peripheral area of the robot through so-called machine learning by itself. In this case, what the machine learning device 100 included in the control device 1 learns corresponds to a model structure representing a correlation of a state of a robot and a state of a person present in a peripheral area of the robot with respect to commands for the robot.

Figure 1:
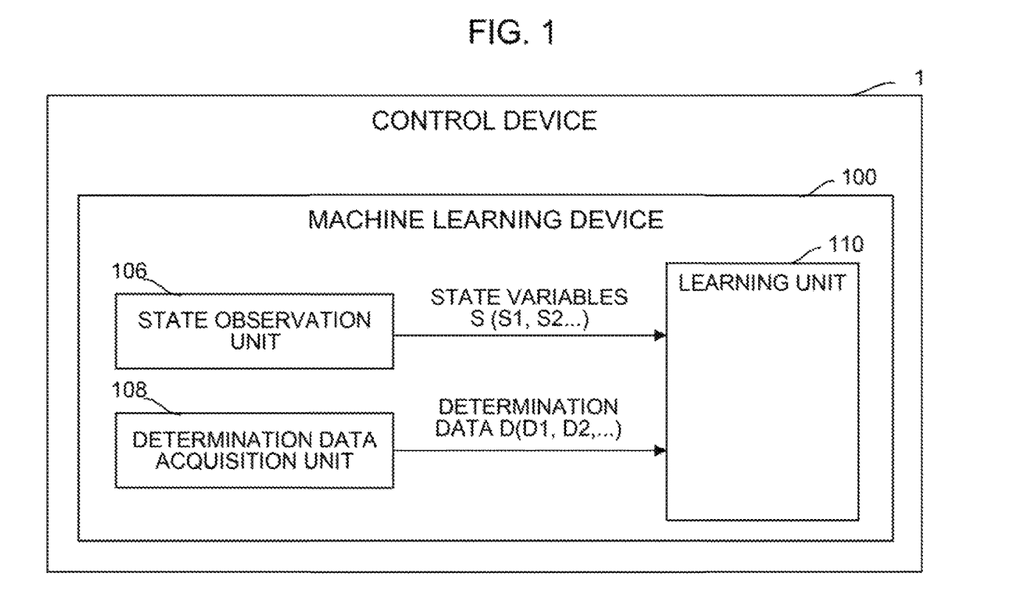
FIG. 1 is a schematic functional block diagram illustrating an aspect of a control device.

As illustrated in the functional block of FIG. 1, the machine learning device 100 included in the control device 1 includes a state observation unit 106, a determination data acquisition unit 108, and a learning unit 110. The state observation unit 106 observes a state of a robot and a state of a person present in a peripheral area of the robot as state variables S representing a current state of an environment. The determination data acquisition unit 108 acquires an interference state between the robot and the person as determination data D. The learning unit 110 performs learning of a state of the robot, a state of the person present in a peripheral area of the robot, and commands for the robot while associating the state of the robot and the state of the person present in the peripheral area of the robot with the commands for the robot by using the state variables S and the determination data D.

The state observation unit 106 may be configured as one function of a processor included in the control device 1, for example. Alternatively, the state observation unit 106 may be configured as software which is used for making the processor function, for example.

A state of a robot among the state variables S is data representing a state of a robot in operation and includes a posture (a combination of joint angles) and a moving speed of a manipulator of the robot. In addition to these, the state of the robot can include a position of the robot and a position of a fed workpiece, for example. All of these are data that the control device 1 can directly observe by a sensor or the like inside the robot. The control device 1 can acquire these data for every control period, for example, and input the data into the state observation unit 106. Alternatively, the control device 1 may acquire these data for every given time in a predetermined period of time and input the set of these time-series data as the state variable S.

A state of a person present in a peripheral area of a robot among the state variables S is data representing a state of a person who is present inside an operation area of the robot (or an arbitrary area including an operation area of the robot) and includes an entering direction of a person who has entered the operation area (from where the person has entered) and a traffic line (a route through which the person has moved), for example. In addition to these, the state of a person can include a position, a speed, and an appearance (a type of clothes (work clothes or a business suit, for example), a color of a headwear, a type of personal adornments, a face, and entered items of an ID, for example) of the person, possessions (a kind of a tool and a kind of a carried workpiece, for example), and the like. The control device 1 photographs the inside of the operation area with a vision sensor, which is not shown, for example, and tracks a person based on the photographed image, being able to specify an entering direction and a traffic line and recognize an appearance and possessions. Since the recognition processing based on images is a known art, the detailed description thereof will be omitted here. Alternatively, the control device 1 may detect an entering direction (from where a person has entered), a traffic line (a route through which the person has moved), a position, and a speed of the person by using an area sensor or a piezoelectric mat, for example, which is not shown. The control device 1 can acquire these data for every control period, for example, and input the data into the state observation unit 106. Alternatively, the control device 1 may acquire these data for every given time in a predetermined period of time and input the set of these time-series data as the state variables S.

Here, the data related to an appearance of a person is used because there may be a correlation between an appearance of a person and a possibility that the person approaches a specific machine. A post, a role, and an operation content, for example, of a person are often reflected on his/her appearance. For example, a person in charge of a line, a supervisor, and an outsider can be distinguished based on his/her appearance. Further, there is a relation between a post of a person and a motion of the person. For example, a correlation such as one that a person in charge of a line highly possibly approaches a specific machine may be established.

The determination data acquisition unit 108 may be configured as one function of the processor of the control device 1, for example. Alternatively, the determination data acquisition unit 108 may be configured as software which is used for making the processor function, for example.

The interference state between a robot and a person as the determination data D is data representing whether or not the robot and the person have collide with each other, a magnitude of the collision force, and a relative distance between the robot and the person, for example. Whether or not the robot and the person have collide with each other and the magnitude of the collision force are data that the control device 1 can observe by using a force sensor or the like. As for the relative distance between a robot and a person, the control device 1 photographs the inside of an operation area by using a vision sensor, which is not shown, being able to specify the relative distance based on the photographed image. Since the object recognition through automatic image analysis and inter-object distance estimation processing are well known arts, detailed descriptions thereof will be omitted here. The control device 1 can acquire these data for every control period and input the data into the determination data acquisition unit 108. Alternatively, the control device 1 may acquire these data for every given time in a predetermined period of time and input the set of these time-series data as the determination data D.

When considered based on a learning period by the learning unit 110, the state variables S inputted into the learning unit 110 are based on data of a preceding learning period in which the determination data D is acquired. Thus, while the machine learning device 100 included in the control device 1 advances learning, acquisition of the state variables S, output of commands (path, speed) for a robot, which are adjusted based on the state variables S, and acquisition of the determination data D are repeatedly performed in an environment.

The learning unit 110 may be configured as one function of the processor of the control device 1, for example. Alternatively, the learning unit 110 may be configured as software which is used for making the processor function, for example. The learning unit 110 learns commands for a robot which correspond to a state of the robot and a state of a person present in a peripheral area of the robot, in accordance with an arbitrary learning algorithm which is collectively called machine learning. The learning unit 110 is capable of repeatedly executing learning based on a data set including the state variables S and the determination data D for every control period or at every arbitrary time.

Through repetition of such learning cycle, the learning unit 110 can automatically identify a feature indicating a correlation of the state variables S representing a state of a robot and a state of a person present in a peripheral area of the robot with respect to commands for the robot. Though the correlation between the state variables S and commands for a robot is substantially unknown at the start of the learning algorithm, the learning unit 110 gradually identifies features as the learning unit 110 advances the learning, and thus the learning unit 110 interprets the correlation. When the correlation between the state variables S and commands for a robot is interpreted to some reliable level, a learning result which is repeatedly outputted by the learning unit 110 goes to a usable level for performing selection (that is, decision-making) of an action for setting values of commands for a robot with respect to a current state (that is, a state of the robot and a state of a person present in a peripheral area of the robot).

As described above, the learning unit 110 of the machine learning device 100 included in the control device 1 learns commands for a robot in accordance with the machine learning algorithm by using the state variables S observed by the state observation unit 106 and the determination data D acquired by the determination data acquisition unit 108. The state variables S are composed of data, which are unlikely affected by disturbance, such as a state of a robot and a state of a person present in a peripheral area of the robot, and the determination data D is uniquely obtained by acquiring an interference state between the robot and the person. Thus, according to the machine learning device 100 included in the control device 1, commands for a robot corresponding to a state of the robot and a state of a person present in a peripheral area of the robot can be automatically and accurately obtained without depending on calculation or estimation.

If commands for a robot can be automatically obtained without depending on calculation or estimation, appropriate values of commands for a robot can be rapidly determined only by grasping a state of the robot and a state of a person present in a peripheral area of the robot. Thus, commands for a robot can be efficiently determined.

Figure 2:
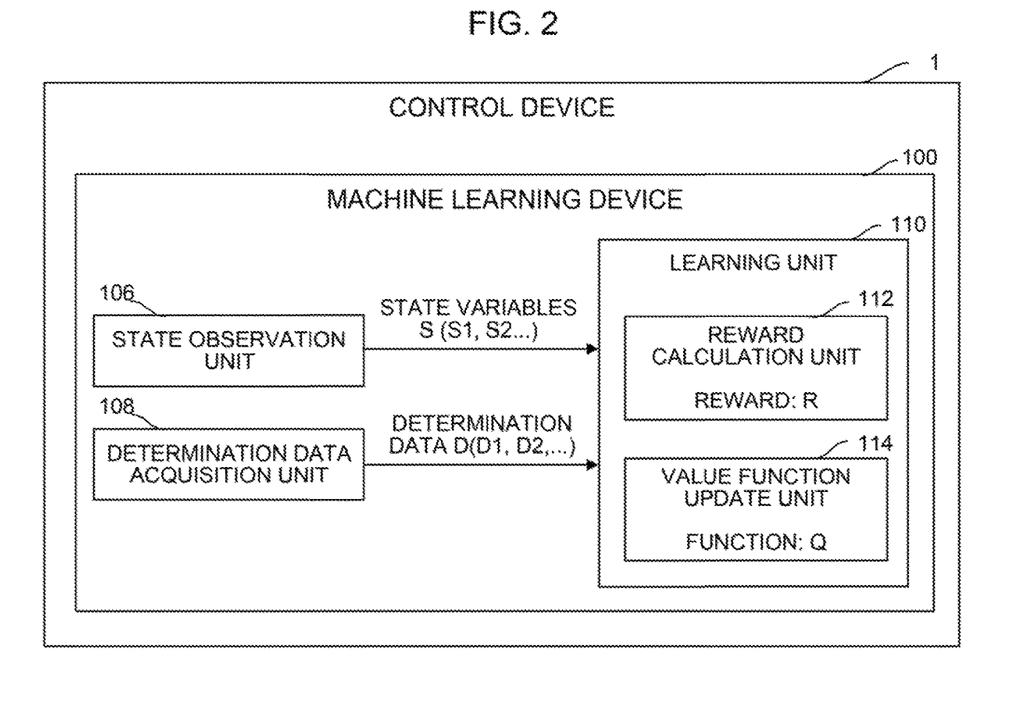
FIG. 2 is a schematic functional block diagram illustrating another aspect of the control device.

In the machine learning device 100 having the above-described configuration, a learning algorithm executed by the learning unit 110 is not especially limited but a known learning algorithm can be employed as machine learning. FIG. 2 illustrates an aspect of the control device 1 illustrated in FIG. 1 and illustrates the configuration including the learning unit 110 which executes reinforcement learning as an example of the learning algorithm. The reinforcement learning is a method in which a cycle, in which a predetermined action (that is, an output) is executed in a current state of an environment in which a learning object exists while observing the current state (that is, an input) and some reward is imparted with respect to the action, is repeated through trial and error so as to learn measures, by which a total reward is maximized, (determination of commands for a robot in the machine learning device in the present application) as an optimal solution.

In the machine learning device 100 included in the control device 1 illustrated in FIG. 2, the learning unit 110 includes a reward calculation unit 112 and a value function update unit 114. The reward calculation unit 112 obtains reward R related to an interference state between a robot and a person (corresponding to the determination data D used in the following learning period of a period in which the state variables S are acquired) in the case where commands for the robot are determined based on the state variables S. The value function update unit 114 updates function Q representing values of commands for a robot, by using the reward R. The learning unit 110 learns optimal solutions of commands for a robot through repeated update of the function Q performed by the value function update unit 114.

An example of an algorithm of the reinforcement learning executed by the learning unit 110 will be described. The algorithm in this example is known as Q-learning and is a method for learning the function Q(s,a) representing a value of an action in the case action a is selected in a state a when the state a of an action subject and the action a which can be selected by the action subject in the state s are set as independent variables. To select the action a to which the value function Q reaches the highest in the state s is an optimal solution. The Q-learning is started in a state in which a correlation between the state s and the action a is unknown and trial and error in selection of various actions a are repeated in an arbitrary state s. Thus, the value function Q is repeatedly updated so as to approach the optimal solution. Here, the configuration is employed in which when an environment (that is, the state s) is changed as a result of selection of the action a in the state s, reward r (that is, weighting of the action a) corresponding to the change can be obtained, and the learning is guided so as to select the action a by which higher reward r can be obtained. Thus, the value function Q can be approximated to the optimal solution in a relatively short period of time.

An update formula of the value function Q can be generally expressed as Formula 1 below. In Formula 1, $s_t$ and $a_t$ respectively denote a state and an action at time t and the state is changed to $s_{t+1}$ depending on the action $a_t$. $r_{t+1}$ denotes reward which is obtained when the state is changed from $s_t$ to $s_{t+1}$. A term of maxQ denotes Q obtained when the action a, in which the maximum value Q is obtained at time t+1 (it is considered at time t that the maximum value Q is obtained at time t+1), is performed. α and γ respectively denote a learning coefficient and a discount rate and are arbitrarily set as 0<α≤1 and 0<γ≤1.

$$Q(s_t, a_t) \leftarrow Q(s_t, a_t) + \alpha \left( r_{t+1} + \gamma \max_a Q(s_{t+1}, a) - Q(s_t, a_t) \right)$$ [Formula 1]

In the case where the learning unit 110 executes the Q-learning, the state variables S observed by the state observation unit 106 and the determination data D acquired by the determination data acquisition unit 108 correspond to the state s in an update formula, the way to determine commands for the robot corresponding to a current state (that is, a state of the robot and a state of a person present in a peripheral area of the robot) corresponds to the action a in the update formula, and the reward R obtained by the reward calculation unit 112 corresponds to the reward r in the update formula. Accordingly, the value function update unit 114 repeatedly updates the function Q representing values of outputs of commands for a robot corresponding to a current state by the Q-learning using the reward R.

In the case where it is determined that a robot and a person do not interfere each other when the robot is controlled based on determined commands after determination of the commands for the robot, for example, the reward R obtained by the reward calculation unit 112 may be set as positive (plus) reward R. In the case where it is determined that the robot and the person have interfered each other or may have interfered each other, for example, the reward R obtained by the reward calculation unit 112 may be set as negative (minus) reward R.

Figure 4A:
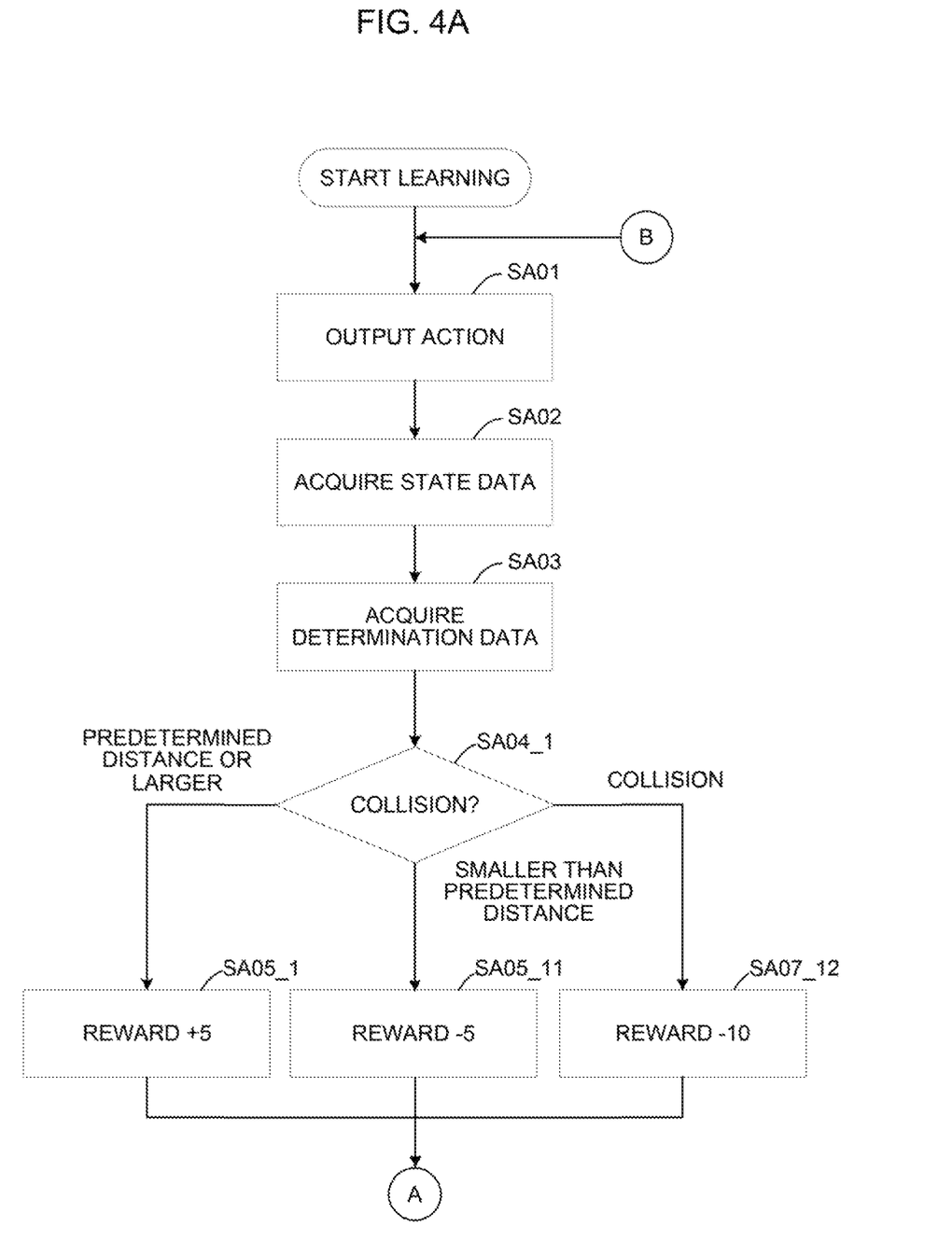
FIG. 4A is a flowchart illustrating another aspect of the machine learning method.
Figure 4B:
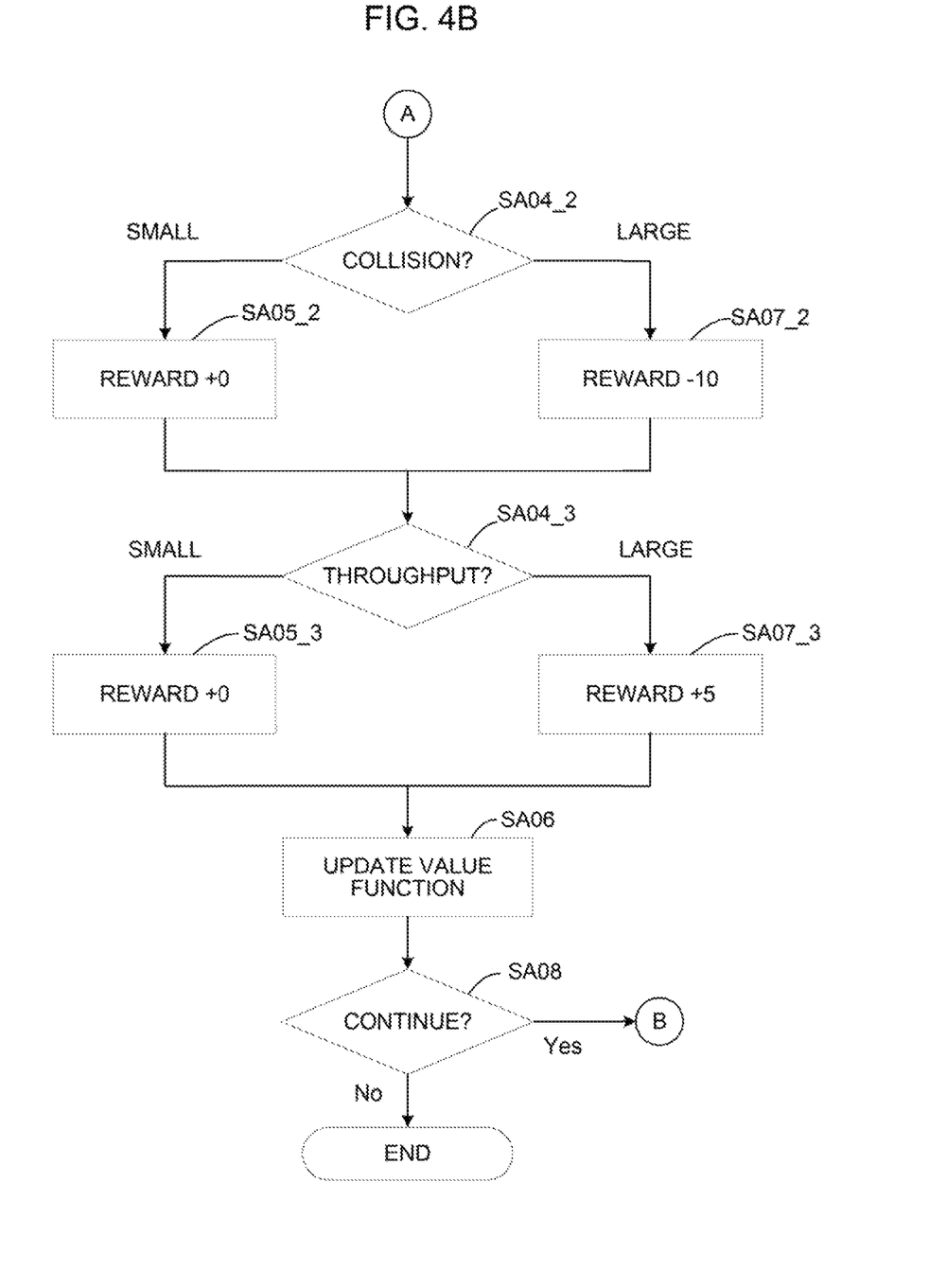
FIG. 4B is a flowchart illustrating the other aspect of the machine learning method.

The reward R can be set to −10, −5, and +5 respectively for the case where a robot and a person have collide with each other, the case where the robot and the person approach each other closer than a predetermined distance, and the case where the robot and the person are away from each other at the predetermined distance or more, for example. Accordingly, the function Q provides evaluation that a command which makes a mutual interference between the robot and the person more difficult has a larger value. Further, the reward calculation unit 112 may impart the reward R by which evaluation becomes lower as the magnitude of the collision force rises. Accordingly, the function Q provides evaluation that a command which brings a smaller impact in collision has a larger value. Furthermore, the reward calculation unit 112 may impart the reward R which becomes higher as throughput of the robot rises. Accordingly, the function Q provides evaluation that a command which makes the mutual interference between the robot and the person more difficult and which brings higher throughput has a larger value (see FIGS. 4A and 4B).

The value function update unit 114 can have an action value table in which the state variables S, the determination data D, and the rewards R are organized while being associated with action values (for example, numeral values) expressed by the function Q. In this case, an action for updating the function Q by the value function update unit 114 is synonymous with an action for updating the action value table by the value function update unit 114. Since the correlation between a current state of an environment and commands for a robot is unknown at the start of the Q-learning, various state variables S, determination data D, and rewards R are prepared in a manner to be associated with values of action values (functions Q) defined on a random basis in the action value table. The reward calculation unit 112 is capable of calculating the reward R corresponding to determination data D as soon as the reward calculation unit 112 gets to know the determination data D, and the calculated value R is written in the action value table.

As the Q-learning is advanced by using the reward R corresponding to an interference state between a robot and a person, the learning is guided to select an action for which higher reward R can be obtained, and a value of the action value (function Q) for an action performed in a current state is rewritten in accordance with a state of an environment (that is, the state variables S and the determination data D) which is changed as a result of execution of the selected action in the current state. Thus, the action value table is updated. By repeating this update, a value of an action value (function Q) displayed on the action value table is rewritten so that the value of the action value is larger as the action is more appropriate. Thus, a correlation between a current state of an environment which has been unknown (a state of a robot and a state of a person present in a peripheral area of the robot) and a corresponding action (commands for the robot) gradually becomes apparent. That is, a relation of a state of a robot and a state of a person present in a peripheral area of the robot with respect to commands for the robot is gradually approximated to an optimal solution through update of the action value table.

Figure 3:
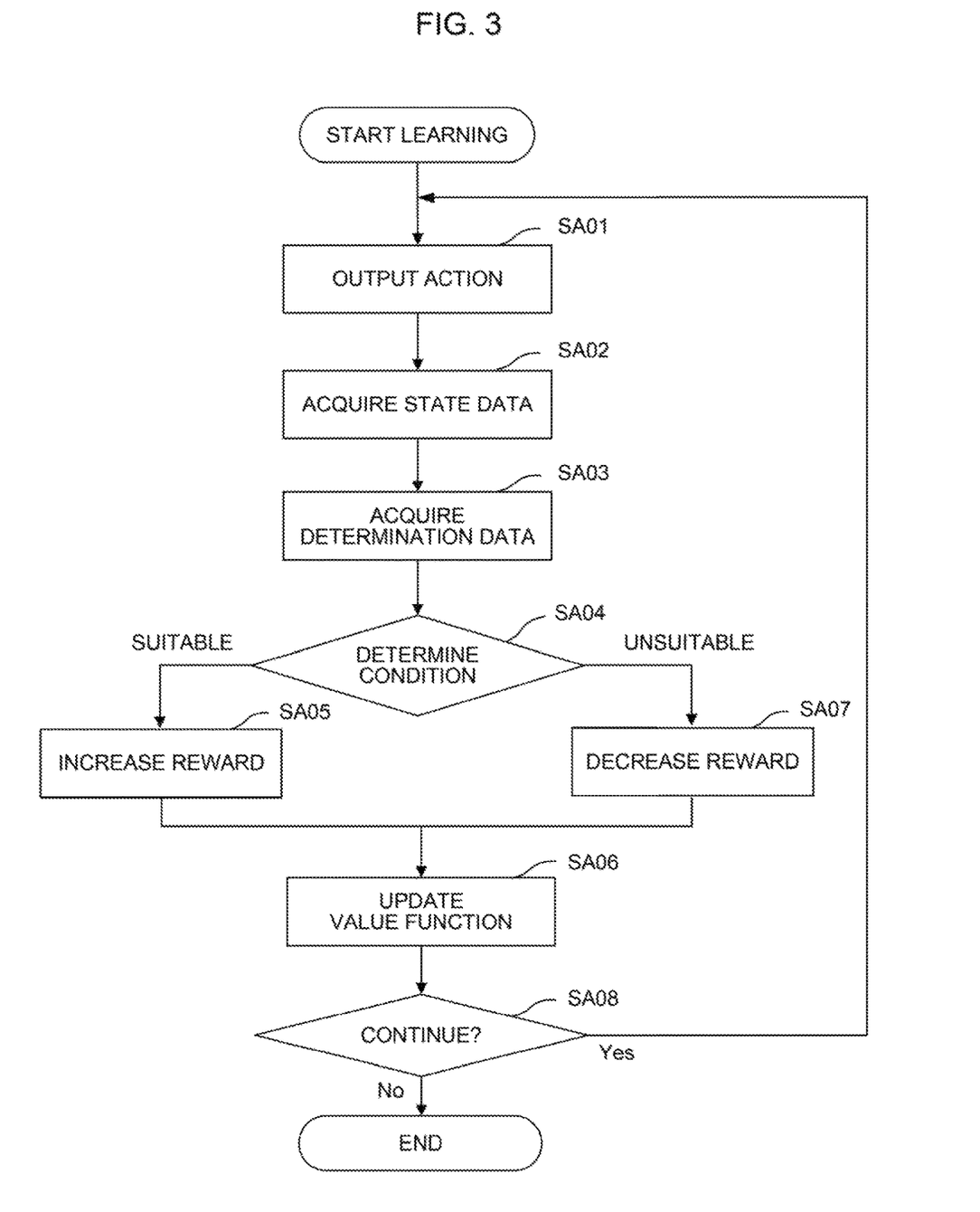
FIG. 3 is a flowchart illustrating an aspect of a machine learning method.

A flow of the above-described Q-learning executed by the learning unit 110 (that is, an aspect of the machine learning method) is further described in reference to FIG. 3. First, in step SA01, the value function update unit 114 selects commands for the robot at random as an action, which is performed in a current state represented by the state variables S observed by the state observation unit 106, while referring to the action value table at that time. Then, the value function update unit 114 takes in the state variables S of the current state observed by the state observation unit 106 in step SA02 and takes in the determination data D of the current state acquired by the determination data acquisition unit 108 in step SA03. Subsequently, the value function update unit 114 determines whether or not the commands for the robot are suitable, based on the determination data D in step SA04. In the case where the commands for the robot are suitable, the positive reward R obtained by the reward calculation unit 112 is applied to an update formula of the function Q in step SA05 and then, the action value table is updated by using the state variables S, the determination data D, the reward R, and the value of the action value (the function Q after update) in the current state in step SA06. In the case where it is determined in step SA04 that the commands for the robot are not suitable, the negative reward R obtained by the reward calculation unit 112 is applied to the update formula of the function Q in step SA07 and then, the action value table is updated by using the state variables S, the determination data D, the reward R, and the value of the action value (the function Q after update) in the current state in step SA06. The learning unit 110 repeatedly updates the action value table by repeating steps SA01 to SA07 so as to advance the learning of optimal solutions of commands for the robot. Here, the processing for obtaining the reward R and the processing for updating the value function performed from step SA04 to step SA07 are executed for each data included in the determination data D.

Figure 5A:
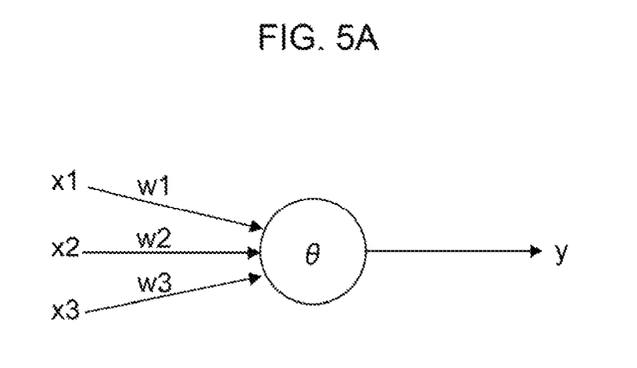
FIG. 5A illustrates a neuron.
Figure 5B:
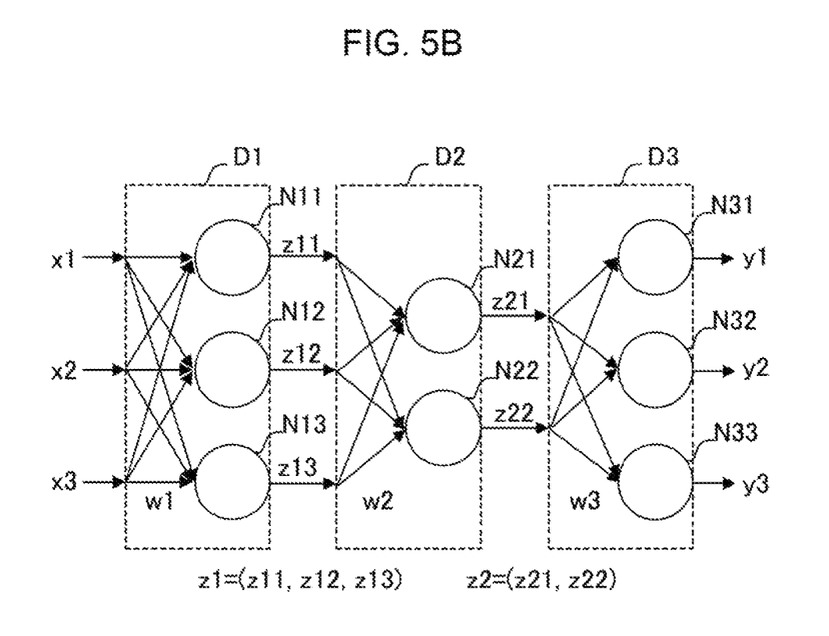
FIG. 5B illustrates a neural network.

When the reinforcement learning is advanced, a neural network, for example, can be employed instead of the Q-learning. FIG. 5A schematically illustrates a model of a neuron. FIG. 5B schematically illustrates a model of a three-layered neural network which is configured by combining the neurons illustrated in FIG. 5A. The neural network can be composed of arithmetic devices, storage devices, or the like, for example, in imitation of the model of neurons.

The neuron illustrated in FIG. 5A outputs a result y with respect to a plurality of inputs x (input $x_1$ to input $x_3$ as an example here). Inputs $x_1$ to $x_3$ are respectively multiplied by weights w ($w_1$ to $w_3$) corresponding to these inputs x. Accordingly, the neuron outputs the output y expressed by Formula 2 below. Here, in Formula 2, all of input x, output y, and weight w are vectors. Further, θ denotes a bias and $f_k$ denotes an activation function.

$$y = f_k(\Sigma_{i=1}^n x_i w_i - \theta)$$ [Formula 2]

In the three-layered neural network illustrated in FIG. 5B, a plurality of inputs x (input x1 to input x3 as an example here) are inputted from the left side and results y (result y1 to result y3 as an example here) are outputted from the right side. In the example illustrated in FIG. 5B, inputs x1, x2, x3 are each multiplied by corresponding weights (collectively denoted by w1) and each of inputs x1, x2, x3 is inputted into three neurons N11, N12, N13.

In FIG. 5B, an output of each of the neurons N11, N12, N13 is collectively denoted by z1. z1 can be considered as a feature vector obtained by extracting a feature amount of an input vector. In the example illustrated in FIG. 5B, feature vectors z1 are each multiplied by corresponding weights (collectively denoted by w2) and each of feature vectors z1 is inputted into two neurons N21, N22. Feature vector z1 represents a feature between weight w1 and weight w2.

In FIG. 5B, an output of each of the neurons N21, N22 is collectively denoted by z2. z2 can be considered as a feature vector obtained by extracting a feature amount of feature vector z1. In the example illustrated in FIG. 5B, feature vectors z2 are each multiplied by corresponding weights (collectively denoted by w3) and each of feature vectors z2 is inputted into three neurons N31, N32, N33. Feature vector z2 represents a feature between weight w2 and weight w3. Finally, neurons N31 to N33 respectively output results y1 to y3.

Here, the method of so-called deep learning in which a neural network having three or more layers is used may be employed as well.

In the machine learning device 100 included in the control device 1, the learning unit 110 performs calculation of the multilayer structure following the above-described neural network by using the state variables S and the determination data D as inputs x so as to be able to output commands for the robot (results y). Further, in the machine learning device 100 included in the control device 1, the learning unit 110 performs calculation of the multilayer structure following the above-described neural network by using the neural network as a value function in the reinforcement learning and using the state variables S and the action a as inputs x so as to be able to output values (results y) of the action in this state as well. Here, operation modes of the neural network include a learning mode and a value prediction mode. For example, weight w can be learned by using a learning data set in the learning mode and value determination of an action can be performed by using the learned weight w in the value prediction mode. Here, detection, classification, inference, and the like can also be performed in the value prediction mode.

The above-described configuration of the control device 1 can be described as a machine learning method (or software) executed by the processor. This machine learning method is a machine learning method for learning commands for a robot. The machine learning method includes: a step for observing a state of the robot and a state of a person present in a peripheral area of the robot as the state variables S representing a current state of an environment; a step for acquiring the determination data D representing an interference state between the robot and the person obtained in accordance with adjusted commands for the robot; and a step for learning a state of the robot, a state of the person present in the peripheral area of the robot, and commands for the robot while associating the state of the robot and the state of a person present in a peripheral area of the robot with the commands for the robot by using the state variables S and the determination data D. In this method, these steps are performed by a CPU of a computer.

Second Embodiment

Figure 6:
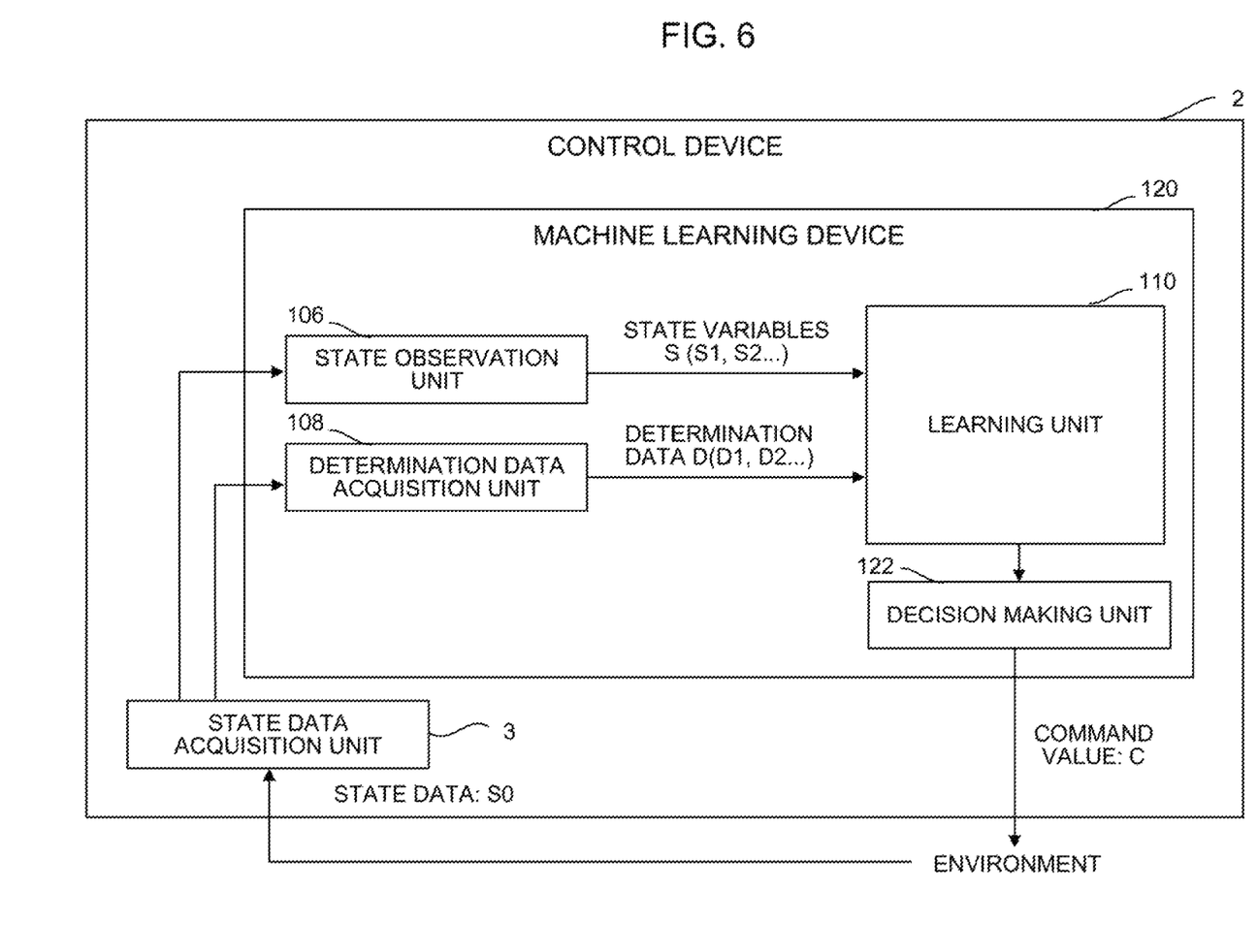
FIG. 6 is a schematic functional block diagram illustrating an aspect of a control device.

FIG. 6 illustrates a control device 2 according to the second embodiment. The control device 2 includes a machine learning device 120 and a state data acquisition unit 3 which acquires a state of a robot and a state of a person present in a peripheral area of the robot, which are the state variables S observed by the state observation unit 106, as state data S0. The state data acquisition unit 3 is capable of acquiring the state data S0 from the control device 2.

The machine learning device 120 included in the control device 2 includes software (a learning algorithm and the like) and hardware (the processor and the like) by which the machine learning device 120 learns commands for a robot through machine learning by itself and further includes software (a calculation algorithm and the like) and hardware (the processor and the like) by which the machine learning device 120 outputs the commands for a robot obtained based on a learning result to the control device 2. The machine learning device 120 included in the control device 2 may have the configuration in which a single common processor executes all software such as a learning algorithm and a calculation algorithm.

A decision making unit 122 may be configured as one function of the processor, for example, included in the control device 2. Alternatively, the decision making unit 122 may be configured as software which is used for making the processor function, for example. The decision making unit 122 generates a command value C including commands for a robot with respect to a state of the robot and a state of a person present in a peripheral area of the robot based on a result obtained through learning by the learning unit 110, and outputs the generated command value C. In the case where the decision making unit 122 outputs the command value C to the control device 2, a state of an environment changes in response to the command value C.

The state observation unit 106 observes the state variables S, which are changed after the decision making unit 122 outputs the command value C to the environment, in the following learning period. The learning unit 110 learns commands for the robot by updating the value function Q (that is, the action value table), for example, by using the changed state variables S.

The decision making unit 122 outputs the command value C representing commands for a robot, which are obtained based on a learning result, to the control device 2. By repeating this learning period, the machine learning device 120 advances the learning of commands for a robot and gradually improves reliability of commands for a robot which are determined by the machine learning device 120.

The machine learning device 120 included in the control device 2 having the above-described configuration exhibits advantageous effects equivalent to those of the machine learning device 100 described above. The machine learning device 120, especially, is capable of changing a state of an environment with an output of the decision making unit 122. On the other hand, in the machine learning device 100, a function corresponding to the decision making unit for reflecting a learning result of the learning unit 110 to an environment may be obtained from an external device.

Other Embodiments

Figure 7:
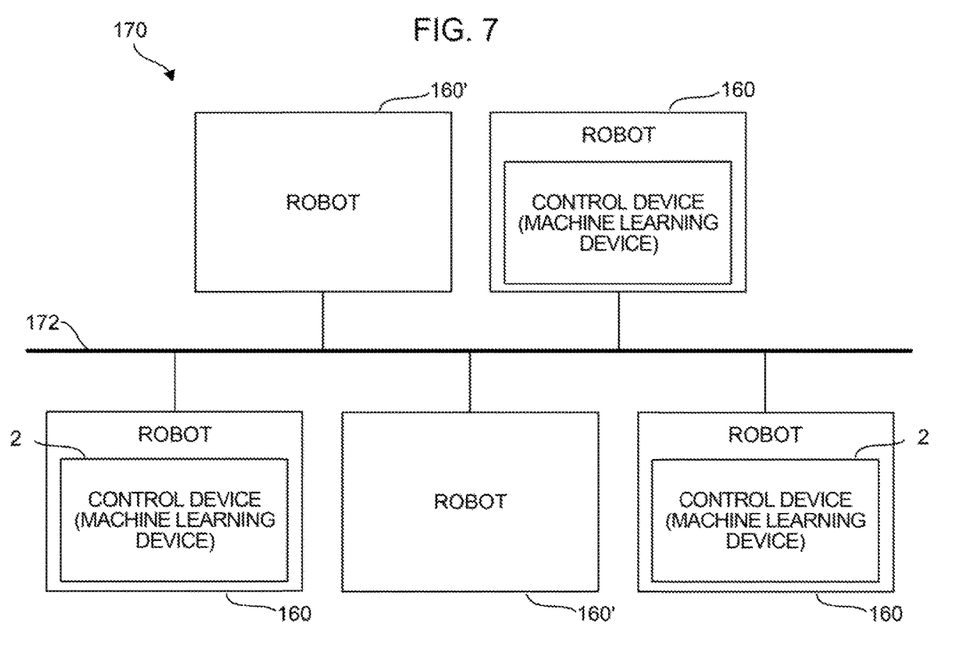
FIG. 7 is a schematic functional block diagram illustrating an aspect of a system in which control devices are incorporated.

FIG. 7 illustrates a system 170 according to an embodiment that includes robots 160. The system 170 includes a plurality of robots 160, 160' which have the same types of configurations and a wired/wireless network 172 which connects these robots 160, 160' to each other. At least one of the plurality of robots 160 is configured as the robot 160 including the control device 2 described above. Further, the system 170 may include the robot 160' which does not include the control device 2. The robots 160, 160' have the configurations and peripheral environments such as an operation area, which are required for an operation for the same purpose.

In the system 170 having the above-described configuration, the robot 160 including the control device 2 among the plurality of robots 160, 160' is capable of automatically and accurately obtaining commands for a robot with respect to a state of the robot and a state of a person present in a peripheral area of the robot by using a learning result of the learning unit 110, without depending on calculation or estimation. Further, the system 170 may be configured so that the control device 2 of at least one robot 160 learns commands for a robot which are common to all of the robots 160, 160' based on the state variables S and the determination data D, which are each obtained for other robots 160, 160', and all the robots 160, 160' share the learning result. According to the system 170, speed and reliability in learning of commands for a robot can be improved by using more various data sets (including the state variables S and the determination data D) as inputs.

Figure 8:
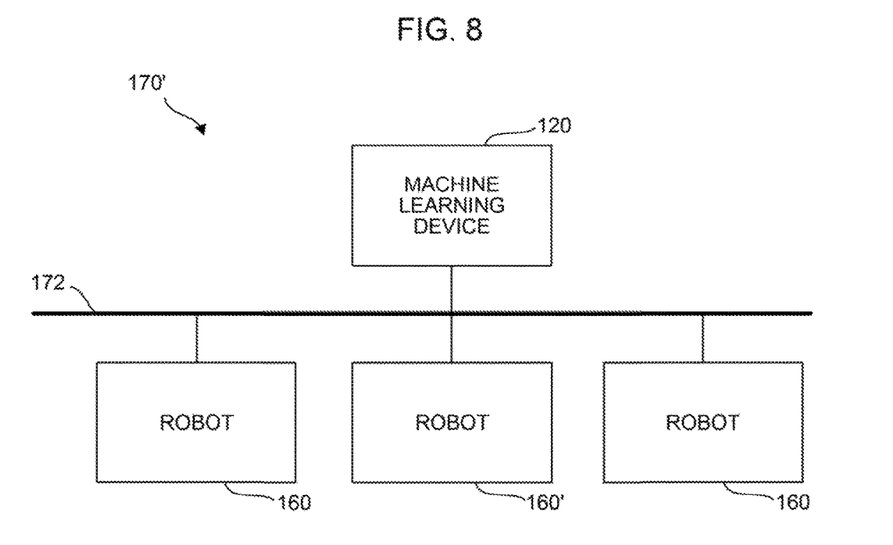
FIG. 8 is a schematic functional block diagram illustrating another aspect of a system in which control devices are incorporated.

FIG. 8 illustrates a system 170' according to another embodiment that includes robots 160'. The system 170' includes the machine learning device 120 (or 100), a plurality of robots 160' which have the same types of configurations, and the wired/wireless network 172 which connects these robots 160' and the machine learning device 120 (or 100) with each other.

In the system 170' having the above-described configuration, the machine learning device 120 (or 100) is capable of learning commands for a robot, which are common to all of the robots 160', with respect to a state of the robot and a state of a person present in a peripheral area of the robot based on the state variables S and the determination data D, which are each obtained for the plurality of robots 160' and accordingly, the machine learning device 120 (or 100) is capable of automatically and accurately obtaining commands for the robot with respect to a state of the robot and a state of a person present in a peripheral area of the robot by using the learning result without depending on calculation or estimation.

The system 170' may have the configuration in which the machine learning device 120 (or 100) exists in a cloud server or the like prepared in the network 172. According to this configuration, required number of pieces of robots 160' can be connected to the machine learning device 120 (or 100) when required, irrespective of a place or time on/in which each of a plurality of robots 160' exists.

An operator engaged in the systems 170 and 170' can execute determination of whether or not the level of achievement of learning of commands for a robot performed by the machine learning device 120 (or 100) (that is, reliability in commands for a robot) has reached a required level, at appropriate time after start of the learning by the machine learning device 120 (or 100).

The embodiments of the present invention have been described above, but the present invention can be embodied in various aspects by adding arbitrary alterations, without being limited to the examples of the above-described embodiments.

For example, the learning algorithm executed by the machine learning devices 100 and 120, the calculation algorithm executed by the machine learning device 120, the control algorithm executed by the control devices 1 and 2, and the like are not limited to the above-mentioned algorithms, but various algorithms may be employed.

The above-described embodiments include the description that the control device 1 (or 2) and the machine learning device 100 (or 120) are devices including CPUs different from each other, but the machine learning device 100 (or 120) may be realized by the processor included in the control device 1 (or 2) and the system program stored in the storage device.

The embodiments of the present invention have been described above, but the present invention is not limited to the examples of the above-described embodiments and can be embodied in other aspects by adding arbitrary alterations.

The invention claimed is:

1. A control device that outputs a command for a robot, the control device comprising:
 a processor configured to:
  observe a state of the robot including a posture and a moving speed of a manipulator of the robot and a state of a person present in a peripheral area of the robot including an entering direction and a traffic line of the person, as state variables representing a current state of an environment,
  acquire determination data representing an interference state between the robot and the person, and learn the state of the robot, learn the state of the person present in the peripheral area of the robot, and learn the command for the robot by associating the state of the robot and the state of the person present in the peripheral area of the robot, by using the state variables and the determination data.

2. The control device according to claim 1, wherein the determination data includes at least any one of whether or not the robot and the person have collide with each other, a relative distance between the robot and the person, a magnitude of the collision force, and throughput.

3. The control device according to claim 1, wherein the processor is further configured to:
 obtain a reward related to an interference state between the robot and the person, and
 update a function representing a value of the command for the robot with respect to the state of the robot and the state of the person present in the peripheral area of the robot, by using the reward.

4. The control device according to claim 1, wherein the processor is further configured to calculate the state variables and the determination data in a multilayer structure calculation.

5. The control device according to claim 1, wherein the processor is further configured to output a command value representing the command for the robot, based on a learning learned by the processor.

6. The control device according to claim 1, wherein the processor is further configured to learn the command for the robot by using the state variables and the determination data, the state variable and the determination data being obtained from a plurality of robots.

7. The control device according to claim 1, wherein the processor exists in a cloud server.

8. A learning device that learns a command for a robot, the learning device comprising:
    a processor configured to:
        observe a state of the robot including a posture and a moving speed of a manipulator of the robot and a state of a person present in a peripheral area of the robot including an entering direction and a traffic line of the person, as state variables representing a current state of an environment;
        acquire determination data representing an interference state between the robot and the person; and
        learn the state of the robot, learn the state of the person present in the peripheral area of the robot, and learn the command for the robot by associating the state of the robot and the state of the person present in the peripheral area of the robot, by using the state variables and the determination data.

* * * * *